(12) United States Patent
Tai et al.

(10) Patent No.: US 9,542,068 B2
(45) Date of Patent: Jan. 10, 2017

(54) SYSTEM AND METHOD FOR CONSTRAINED MANIPULATIONS OF 3D OBJECTS BY MULTITOUCH INPUTS

(75) Inventors: Chiew Lan Tai, Hong Kong (CN); Kin Chung Au, Hong Kong (CN); Hongbo Fu, Hong Kong (CN)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 104 days.

(21) Appl. No.: 14/347,230

(22) PCT Filed: Feb. 7, 2012

(86) PCT No.: PCT/CN2012/000150
§ 371 (c)(1),
(2), (4) Date: Mar. 25, 2014

(87) PCT Pub. No.: WO2013/060085
PCT Pub. Date: May 2, 2013

(65) Prior Publication Data
US 2014/0229871 A1    Aug. 14, 2014

Related U.S. Application Data

(60) Provisional application No. 61/552,413, filed on Oct. 27, 2011.

(51) Int. Cl.
*G06F 3/048* (2013.01)
*G06F 3/0481* (2013.01)
(Continued)

(52) U.S. Cl.
CPC ......... *G06F 3/04815* (2013.01); *G06F 3/0488* (2013.01); *G06F 3/04817* (2013.01);
(Continued)

(58) Field of Classification Search
None
See application file for complete search history.

(56) References Cited

U.S. PATENT DOCUMENTS 8,289,316 B1 * 10/2012 Reisman ............... G06F 3/0425
345/173
8,581,901 B2 * 11/2013 Joshi ....................... G06T 19/20
345/419

(Continued)

FOREIGN PATENT DOCUMENTS

WO        2010022386         2/2010

OTHER PUBLICATIONS

Kruger, et al. "Fluid integration of rotation and translation". In CHI 2005, Apr. 2-7, 2005, Portland, Oregon, USA, pp. 601-610.
(Continued)

*Primary Examiner* — Hua Lu
(74) *Attorney, Agent, or Firm* — Amin, Turocy & Watson, LLP (57) ABSTRACT

Described herein are systems and methods that employ a widgetless and buttonless multi-touch interface for constrained manipulations of 3D objects. The widget-less multi-touch user interface can map different multi-touch gestures to different 3D object manipulation tasks, allowing a user to manipulate 3D objects without operating widgets or performing mode switchings or tool selections. User interaction is greatly simplified by using single touch actions that simultaneously specify the transformation constraint, the transformation type, and the magnitude of transformation and apply the transformation to the focus object. Additionally, the axis-based constrained manipulations support active snapping and axis transfer. Active snapping allows the user to draw a free touch path connecting two 3D objects to be snapped together, avoiding tedious operations required with standard transformation manipulations. Axis transfer pro-
(Continued)

vides a simple solution to achieve relative transformations between objects, allowing an object to be transformed along a specific predefined axis of another object.

20 Claims, 11 Drawing Sheets (51) Int. Cl.
*G06F 3/0484* (2013.01)
*G06F 3/0488* (2013.01)
*G06T 19/20* (2011.01)

(52) U.S. Cl.
CPC ...... *G06F 3/04842* (2013.01); *G06F 3/04845* (2013.01); *G06F 3/04883* (2013.01); *G06T 19/20* (2013.01); *G06F 2203/04808* (2013.01); *G06T 2219/2004* (2013.01); *G06T 2219/2016* (2013.01)

(56) References Cited

U.S. PATENT DOCUMENTS

| | | | | |
|---|---|---|---|---|
| 8,799,821 | B1* | 8/2014 | De Rose | G06F 3/04842 715/821 |
| 8,836,646 | B1* | 9/2014 | De Rose | G06F 3/04842 345/173 |
| 2006/0250393 | A1* | 11/2006 | Tsang | G06F 3/04845 345/420 |
| 2010/0045666 | A1* | 2/2010 | Kornmann | G06F 1/1626 345/419 |
| 2010/0146389 | A1* | 6/2010 | Yoo | G06F 3/04815 715/702 |
| 2011/0022958 | A1* | 1/2011 | Kang | G06F 9/4443 715/716 |
| 2011/0041098 | A1* | 2/2011 | Kajiya | G06F 3/04815 715/849 |
| 2011/0107270 | A1* | 5/2011 | Wang | G06F 19/3437 715/850 |
| 2011/0285667 | A1* | 11/2011 | Poupyrev | G06F 3/045 345/174 |
| 2012/0174022 | A1* | 7/2012 | Sandhu | G06F 19/3406 715/781 |
| 2013/0127825 | A1* | 5/2013 | Joshi | G06T 19/20 345/419 |
| 2013/0172906 | A1* | 7/2013 | Olson | A61B 19/2203 606/130 |
| 2015/0082253 | A1* | 3/2015 | DeRose | G06F 3/04842 715/849 |

OTHER PUBLICATIONS

Hancock, et al. "Rotation and translation mechanisms for tabletop interaction". In IEEE International Workshop on Horizontal Interactive Human-Computer Systems TABLETOP '06 (Jan. 2006), pp. 79-88.

Hancock, et al. "Shallow-depth 3d interaction: design and evaluation of one-, two and three-touch techniques". CHI 2007, Apr. 28-May 3, 2007, San Jose, California, USA pp. 1147-1156.

Hancock, et al. "Sticky tools: Full 6DOF force-based interaction for multi-touch tables". ITS '09, Nov. 23-25, 2009, Banff, Alberta, Canada, pp. 145-152.

Reisman, et al. "A screen-space formulation for 2d and 3d direct manipulation". UIST '09, Oct. 4-7, 2009, Victoria, British Columbia, Canada, pp. 69-78.

Schmidt, et al. "Sketching and composing widgets for 3d manipulation". EUROGRAPHICS 2008, Computer Graphics Forum, vol. 27 (2008), No. 3, 301-310.

International Search Report for PCT Application Serial No. PCT/CN2012/000150, dated Aug. 2, 2012, 2 pages.

* cited by examiner

SYSTEM AND METHOD FOR CONSTRAINED MANIPULATIONS OF 3D OBJECTS BY MULTITOUCH INPUTS

CROSS REFERENCE RELATED TO APPLICATIONS

This patent application is a U.S. National Stage of, and claims priority to, PCT Application Serial No. PCT/CN2012/000150, filed Feb. 7, 2012, entitled "System and Method for Constrained Manipulations of 3D Objects by Multitouch Inputs", which claims priority to U.S. Provisional Patent Application No. 61/552,413, filed Oct. 27, 2011, entitled "Multi-Touch Interfaces for 3D Object Manipulation," the entireties of which are incorporated herein by reference.

TECHNICAL FIELD

This disclosure relates generally to three dimensional (3D) object manipulation and in particular to multitouch input devices that can facilitate 3D object manipulation tasks based on touch gestures.

BACKGROUND

Three dimensional (3D) modeling is an important tool utilized in the engineering, design, entertainment and other industries. With 3D modeling, a user can create, position, scale and orientate 3D objects in virtual space. Existing 3D modeling solutions are generally limited by a 2D display and single-point 2D input (e.g., mouse, pen device, or the like). Because of these limitations, 3D modeling software packages are often difficult to use, relying on small control widgets and a large set of keyboard shortcuts or mode-switching buttons.

Many new digital devices are equipped with touch pads, touch screens or the like, which have very different input properties from keyboard-, mouse- and pen-based input systems. Since the input properties are so different, traditional 3D manipulation interfaces must be re-designed to adapt to the tactile paradigm. Further, the small control widgets and the large set of mode-switching buttons employed by standard interfaces are difficult to operate on a muti-touch device due to the "fat finger" problem of touch devices where the input resolution is not sharper than a fingertip-blob.

The above-described deficiencies of traditional 3D manipulation interfaces with respect to touch input devices are merely intended to provide an overview of some of problems of current technology, and are not intended to be exhaustive. Other problems with the state of the art and corresponding benefits of some of the various non-limiting embodiments described herein may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

Described herein are user interfaces that can directly map different multi-touch gestures to different 3D manipulation tasks. These user interfaces are generally free of buttons or widgets, employing only a small set of multi-touch gestures in place of the widgets. Utilizing gestures rather than widgets eliminates traditional screen-cluttering widgets and enables an easy, seamless control of manipulation constraints (i.e., axis or plane) and modes (i.e., translation, rotation or scaling). This avoids tedious editing steps such as mode/tool switching in traditional modeling scenarios.

The user interfaces herein can employ methods allowing direct mapping of multi-touch gestures to different 3D manipulation tasks/operations. According to the method, a focus object can be selected. Then, an axis can be selected by an orientation of at least two touch points. A transformation mode (e.g., translation, rotation, scaling) and an amount of transformation (e.g., displacement, rotation angle) can be determined by a motion of the at least two touch points with respect to the selected axis. This allows a 3D object in a 3D environment to be manipulated with rigid transformations and scaling based on a single multi-touch gesture (a sequence of finger-down, move, finger-up touch movements), without requiring any manipulation widgets. An axis, plane or any other geometry element defined with the editing object or any constraint defined by the user can be selected as a constraint. 3D objects can also be snapped or connected using position and tangent information associated with a touch path of the gesture. A selected constraint can be transferred to other 3D objects so that the rigid transformations and scalings can be accomplished for these objects with respect to the constraint associated with another 3D object.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Described herein is a 3D modeling solution that provides rich, intuitive control for constrained manipulation of 3D objects in 3D space without requiring input from widgets, buttons, or the like. The modeling solution allows users to manipulate 3D objects via a simple gesture input on a multi-touch input device of any size. Multi-touch input devices, such as touch screens, touch pads and the like, are widely used in connection with digital devices. The modeling solution described herein does not utilize small control widgets, keyboard shortcuts or mode-switching buttons, instead it utilizes a single gesture input that facilitates axis- or plane-constrained translation, rotation and scaling of a 3D model, providing seamless, intuitive and context-aware manipulation of 3D objects and simple active snapping and axis transfer functionalities.

Reference throughout this specification to "various embodiments," "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

The words "exemplary" and "example" is used herein to mean serving as an example, instance, or illustration. For the avoidance of doubt, the subject matter described herein is not limited by such examples. In addition, any aspect or design described herein as "exemplary" is not necessarily to be construed as preferred or advantageous over other aspects or designs, nor is it meant to preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

For simplicity of explanation, anything described herein as a "method" is depicted and described as a series of acts. A system, apparatus or device can execute these methods (e.g., facilitated by a processor) to perform the acts. Systems, apparatuses or devices can have "components" stored in memory that can facilitate execution of various methods, components, acts, tools or the like.

It is to be understood and appreciated that the various embodiments are not limited by the acts illustrated and/or by the order of acts. For example, acts can occur in various orders and/or concurrently, and with other acts not presented or described herein. Furthermore, not all illustrated acts can be required to implement the components, methods or algorithms as described herein. In addition, those skilled in the art will understand and appreciate that the methods could alternatively be represented as a series of interrelated states via a state diagram or events. The components and methods be stored in memory or other non-transitory computer readable storage medium and executed by a processor to facilitate the acts shown in the figures.

Figure 1:
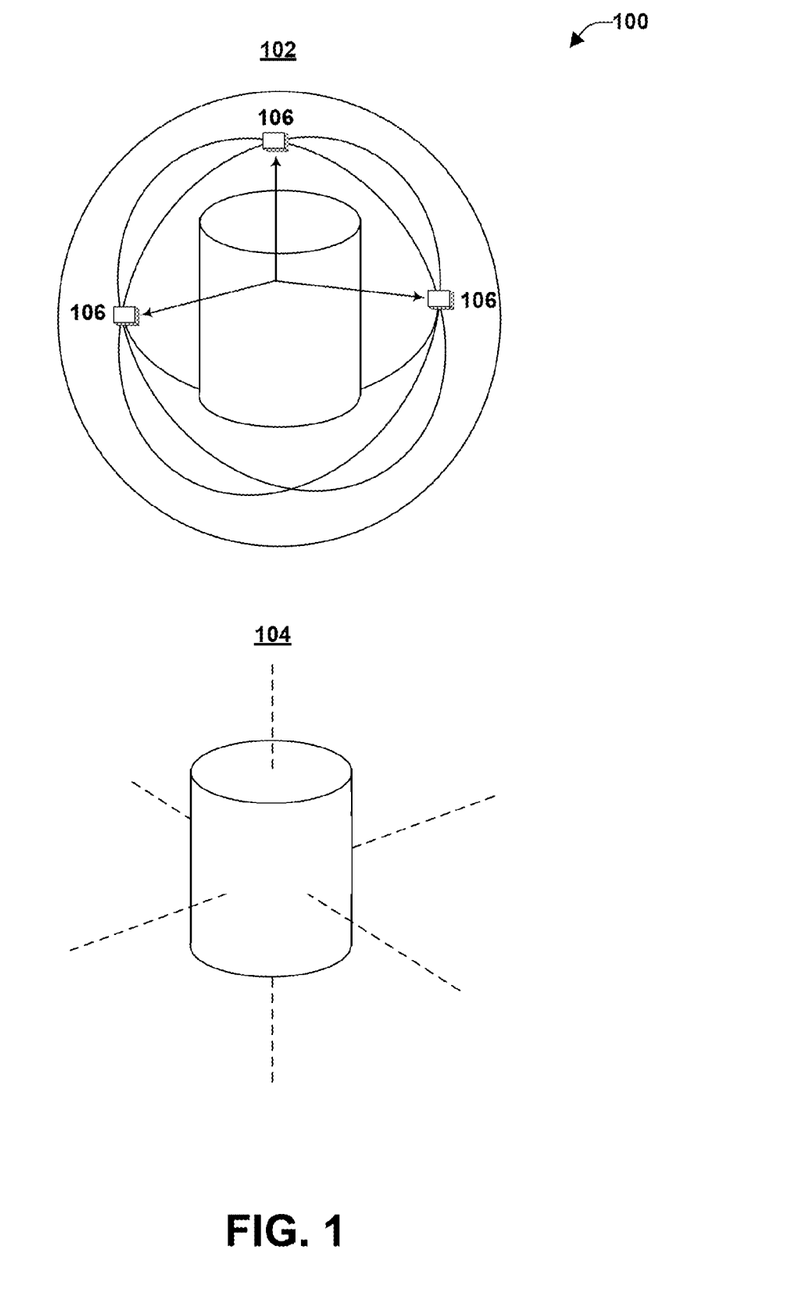
FIG. 1 is a schematic illustration comparing an example of a traditional widget-based 3D manipulation interface and the widget-less multi-touch user interface for constrained manipulations described herein.

Referring now to FIG. 1, illustrated is a schematic comparison 100 between an example of a traditional widget-based 3D manipulation interface 102 and the widget-less 3D manipulations interface described herein 104. Both the traditional 3D manipulation interface 102 and the widget-less multi-touch 3D manipulation interface 104 can facilitate constrained manipulations of 3D objects.

The traditional 3D manipulation interface 102 employs transformation widgets to facilitate constrained manipulation of 3D objects. These constrained manipulations are commonly used in many 3D applications for fine-grained manipulations. The defining characteristic of a transformation widget is the ability to provide a single interaction point or handle for the direct manipulation of a 3D object. A transformation widget typically contains multiple visual handles (e.g., element 106) for different manipulation purposes, which requires every single click to be exactly within the corresponding handles. Since transformation widgets have been mainly designed for mouse-based systems, they are not user-friendly for multi-touch interfaces.

A direct adaption of standard transformations widgets to the tactile paradigm employed in connection with multi-touch input devices is ineffective due, for example, to fingertip-blob input resolution (the "fat finger" problem) and occlusion by fingers. Although the visual redesign of the widgets for touch screens may mitigate the fat finger problem, such redesigned widgets still employ many handles, which require visual attention at virtually every touch, since every tap must be precisely and directly operated on proper elements of the widgets.

The widget-less multi-touch 3D manipulation interface is designed to be largely orthogonal to the design of the traditional transformation widgets of the traditional 3D manipulation interface 102, eliminating all visual widget handles in the user interface to move away from tedious widget manipulation. Instead, with the widget-less multi-touch 3D manipulation interface 104, different functionalities can be mapped to different multi-touch gestures on the multi-touch input device. The widget-less multi-touch 3D manipulation interface 104 utilizes candidate axes, which are for visualization rather than direct manipulation. This design not only minimizes visual clutter, but also tolerates imprecise touch-based inputs.

As multi-touch inputs (gestures) contain rich orientation (relative positions of multitouch points) and transformation (motion paths of touch points) information, they suit the need of 3D manipulations which requires multi-dimension inputs. The widget-less multi-touch 3D manipulation user interface 104 introduces a small set of easy-to-use multi-touch gestures to replace the traditional widget handles bound by the following guidelines: (1) to avoid precise widget manipulation, no visual handles should be provided for direct manipulation; (2) for gesturing to be effective, multitouch gestures must be recognized independent of scale and location; and (3) the functionalities can be related to manipulation constraints, such as axis or plane, or modes, such as translation, rotation, or scaling (see FIG. 2—translation 202, scaling 204, rotation 206). Additionally intuitive touch gestures can be utilized for relative manipulations, including snapping and borrowing axes of another object.

Most existing 3D modeling solutions, such as traditional 3D manipulation interface 102, typically support two mechanisms of 3D manipulation of 3D objects: unconstrained manipulation and constrained manipulation. Unconstrained manipulation allows 3D transformations along arbitrary axes and is typically useful for coarse manipulations (e.g., various virtual trackballs for 3D orientation manipulations). Constrained manipulation supports fine-grained 3D manipulations.

Existing multi-touch techniques can employ multi-touch input to enable simultaneous manipulation of several degrees of freedom (DOF) to perform unconstrained manipulations. However, these existing multi-touch techniques are not designed for constrained and fine-grained 3D manipulations.

Figure 2:
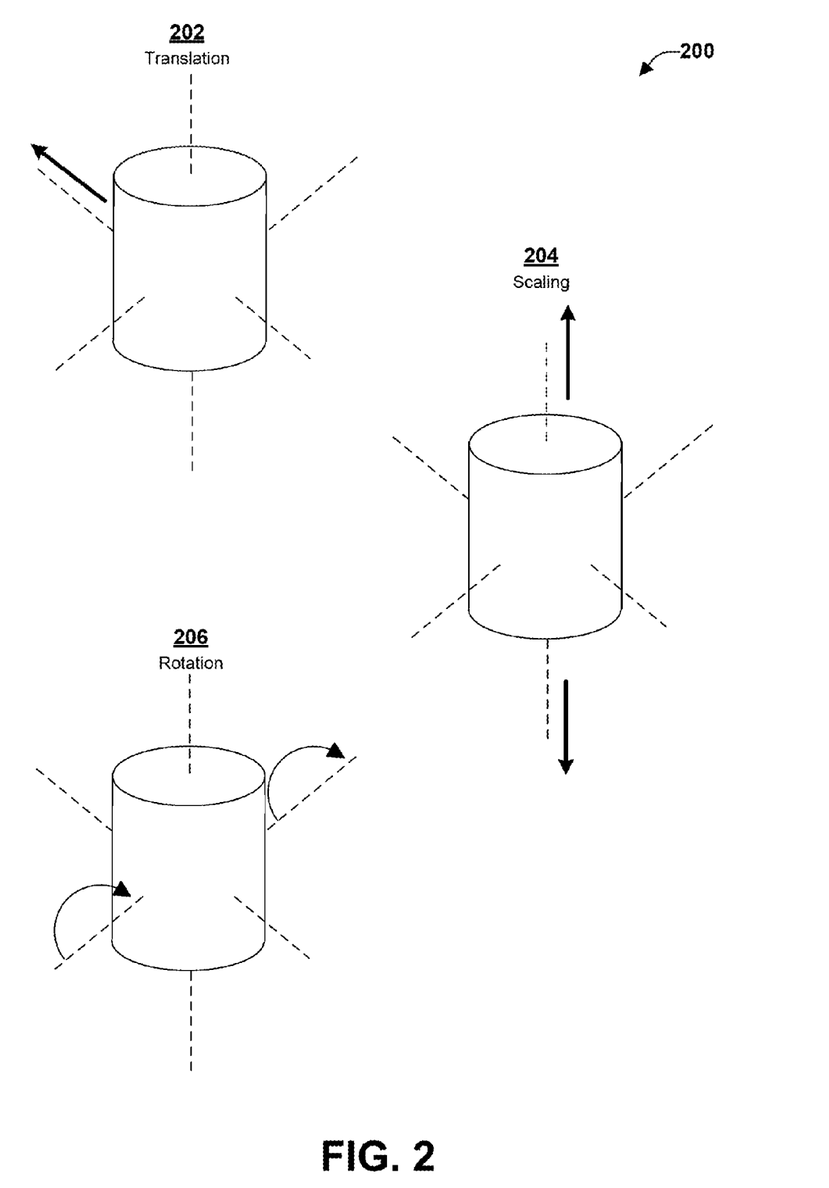
FIG. 2 is a schematic illustration of three types of axis-constrained transformations: translation, scaling and rotation.
Figure 3:
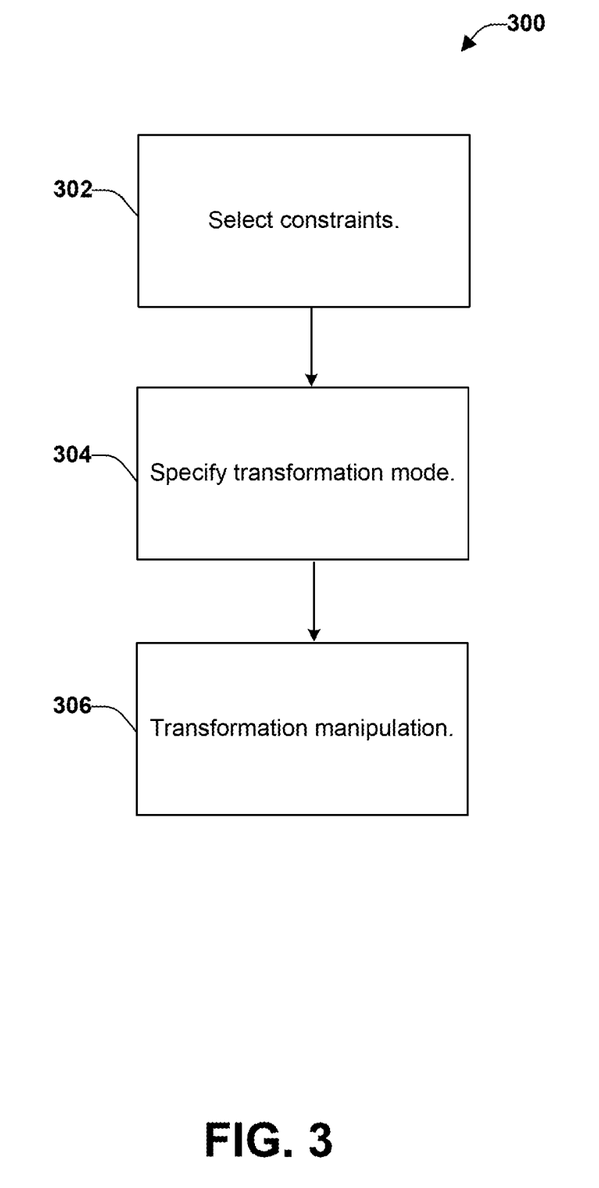
FIG. 3 is a schematic process flow diagram of a method for constrained 3D manipulation.

Constrained 3D manipulation involves three basic acts, as illustrated in FIG. 3. At element 302, constraints can be selected. The constraints can be an axis, a plane or other geometry element defined with the editing object or any constraint defined by the user. At element 304, the transformation mode can be specified. The transformation mode, as illustrated in FIG. 2, can include translation, rotation and scaling. At element 306, the transformation manipulation can occur based on the constraints and the transformation mode and the amount of mouse/touch movement. The magnitude of the transformation can be determined during the transformation manipulation 306, for example, by the amount of mouse movement and/or movement of the touch points. In a traditional 3D manipulation interface (like tool 102), these acts are facilitated by widgets. In the widget-less multi-touch 3D manipulation interface, these acts are performed seamlessly with a single gesture, without the aid of widgets.

Traditional 3D manipulation tools 102 can perform constrained transformations through 3D transformation widgets. Although the visual design and implementation details of transformation widgets can vary, their design and functionality is largely the same: (1) a three-axis canonical frame as a basic component for independent control of axis-constrained manipulations ("constraints"); and (2) multiple DOF controls for translation, rotation and scaling that can be displayed at the same time ("DOF controls"). A successful manipulation relies on a precise selection of constraints and DOF controls.

Traditional 3D transformation widgets are mainly designed for use with keyboard and single-point devices (e.g., mouse or pen) and rely on a large set of keyboard shortcuts or mode-switching buttons. As multi-touch input devices have very different input properties from traditional keyboard-, mouse- and pen-based input systems, traditional 3D manipulation tools 102 have to be re-designed to adapt to the tactile paradigm. Existing solutions mainly attempt to tackle the problem of how to make the transformation widgets more easily selectable and manipulatable with a fingertip by redesigning the form and configuration of the widgets. However, like standard transformation widgets, the redesigned widgets directly associate different transformation tools with different widget components, thus requiring careful touch positioning to trigger appropriate tools. The widget-less multi-touch 3D manipulation user interface eliminates these widgets all together and, instead, relies on gesture inputs.

The gestures utilized by the widget-less multi-touch 3D manipulation interface are bound by the following constraints. To make gestures easy to master, they should be simple and intuitive to use. The number of gestures should be small. Additionally, single-hand gestures should be designed for most operations, since in many scenarios the other hand is needed for other tasks (e.g., holding the multi-touch input device). To make a small set of simple gestures sufficient to encompass all the available interactions provided by standard transformation widgets, reuse of gestures should be allowed and they can be interpreted as context-aware operations.

Figure 4:
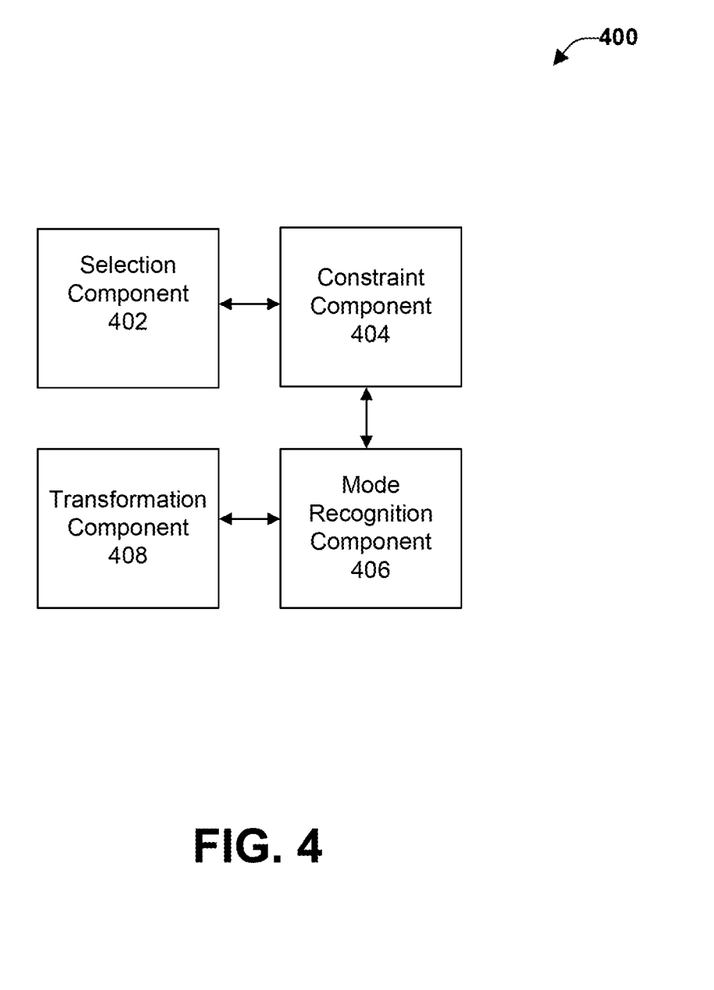
FIG. 4 is a schematic system block diagram of a system that facilitates constrained 3D manipulation on multi-touch devices.

Referring now to FIG. 4, illustrated is a system 400 that facilitates a widget-less multi-touch 3D manipulation user interface for 3D manipulation. The system can include a selection component 402 that can receive a selection of a focus object for manipulation using a tap gesture. An example of a tap gesture is a single pair finger-down and finger-up touch movement.

The system can also include a constraint component 404 that can facilitate choosing a constraint from candidate constraints of a selected object (see FIG. 5) based on the orientation of two fingers that touch the screen. The constraint selection can identify an axis or a plane that the transformation will be performed with respect to. The transformation mode can be translation, rotation or scaling. Axis selection can be determined by the orientation of two touched points. The orientation of two touch points can also select a planar constraint to perform translation/scaling in plane. Any other geometry element defined with the editing object or any constraint defined by the user can be selected as a constraint. Snapping plane constraints can be selected according to the position and tangent at two ends of a touch path for snapping one object to another.

The system can also include a mode recognition component 406 that can determine a transformation mode based on the movement of the two touch points with respect to the constraint chosen by the constraint component 404. The system can further include a transformation component 408 that determines an amount of transformation according to the motion of the two contact points (e.g., an amount of displacement of fingers) and can apply a transformation according to the recognized transformation mode and the amount of transformation.

Figure 5:
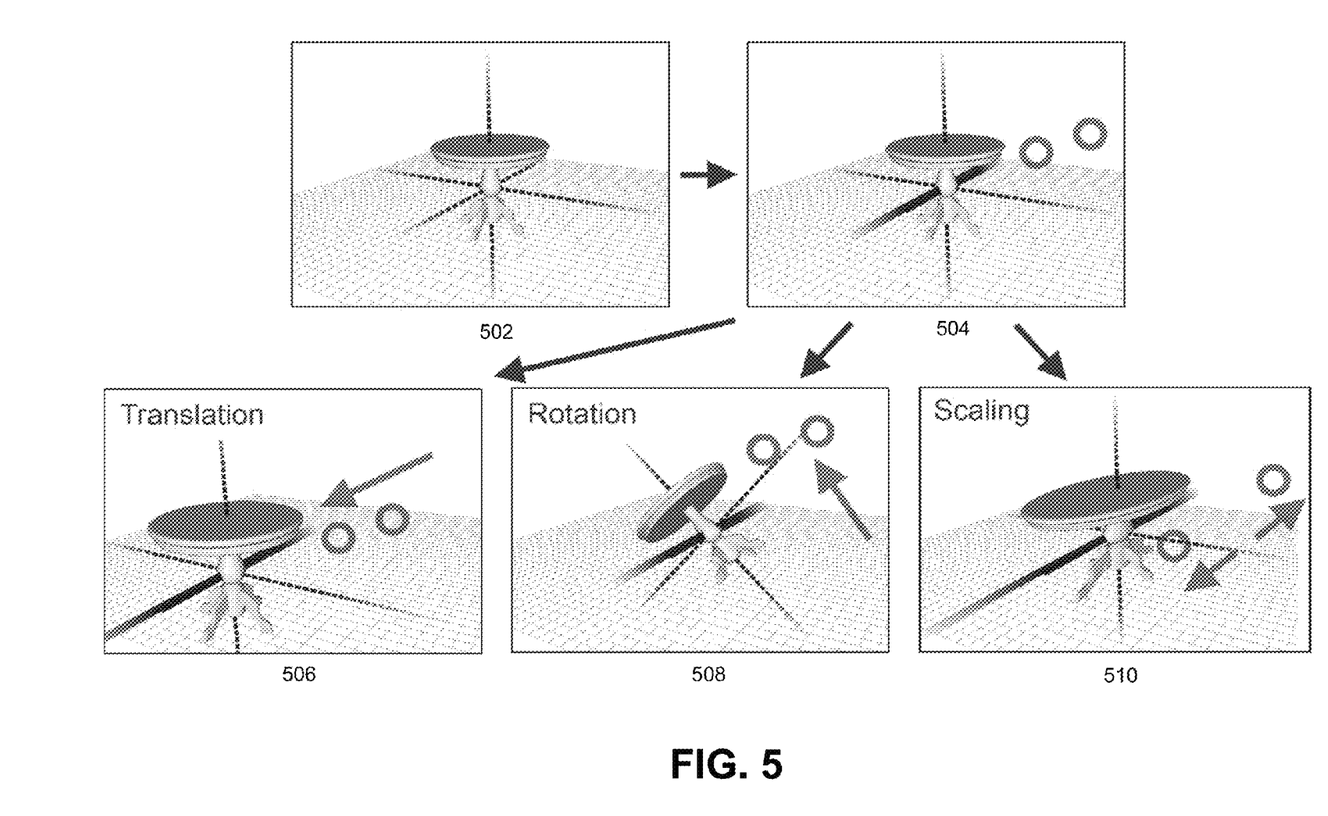
FIG. 5 is a schematic illustration of multi-touch gestures for axis-based transformation manipulations.

FIG. 5 is a schematic illustration of multi-touch gestures for axis-constrained transformation manipulations. At element 502, an object can be selected for manipulation. Once the object is selected for manipulation, its predefined axis set can be displayed. At element 504, a user can select an axis of interest (exhibited by the thicker line) based on the orientation defined by two contact points (circles in the example). Axis selection can be determined by the initial orientation of the two touched points and the transformation mode can be determined by the subsequent motion of the two touched points with respect to the selected axis. Therefore, a single multi-touch action (e.g., a sequence of finger-down, move, and finger-up touch movements) is sufficient to determine the desired transformations (translation, rotation or scaling) with respect to a desired axis. Such action does not require any complex transformation widget for direct manipulation. Candidate axes are provided for visualization rather than direct manipulation.

Like standard transformation widgets, a predefined set of candidate axes for the object selected for editing can be maintained. Such candidate axes can be obtained either by simple methods (e.g., object-oriented bounding boxes, face normal and principal curvature directions, or the like) or by more complex shape analysis (e.g., reflective symmetry axes, upright orientations, or the like). By projecting each candidate axis to the view plane, a 2D line can correspond to each axis. Therefore it is sufficient to use a two-point touch to specify an axis of interest: the candidate axis with the projected orientation most similar to the orientation determined by the locations of the two touch points is used as the axis constraint for manipulation (e.g., the highlighted axis). The candidate axes are displayed for visualization only and are not touchable handles for direct manipulation. The two fingers can be placed anywhere on the screen, making the gesture independent of location and scale. From viewpoints where an axis is nearly parallel to the viewing direction, its selection is disallowed, since translation or scaling along the selected axis is generally difficult to predict.

Once an axis of interest is selected, a transformation mode can be determined (e.g., translation, rotation or scaling) according to the movement of the two fingers relative to the chosen axis (along or perpendicular), and the amount of transformation can be calculated according to the displacement. The entire process of specifying the transformation mode and applying the transformation is seamless, involving only a single multi-touch gesture.

At element 506, a gesture of a two-finger pan along the selected axis can correspond to an axis-constrained translation. The axis-constrained rotation at element 508 can also be achieved by the gesture of two-finger pan, but perpendicular to the selected axis. Both the amount of translation and the amount of rotation can be calculated according to the average displacement of the two contact points on the screen. This context-aware gesture is intuitive to use, since it is analogous to the movement patterns with standard transformation widgets (i.e., moving along the axis for translation and perpendicular to the axis for rotation, given the explicitly specified axis and manipulation mode).

At element 510, a two-finger pinch along the axis can correspond to an axis-constrained scaling. The two fingers can be pinched together or apart. The amount of scaling can be defined by the ratio between the current and initial distances of the two contact points.

The gestures can be easily recognized according to an initial orientation of the two contact points and the subsequent movement relative to the selected axis. The gestures are not recognized until the contact points have displacements larger than a given threshold (e.g., any displacement larger than simple hand jitter). Once a gesture is recognized, the corresponding transformation mode is activated and remains unchanged until the fingers no longer contact the multi-touch input device. It can be possible to switch between the different transformation modes in a single touch action by adapting the idea of magnitude filtering.

Figure 5B:
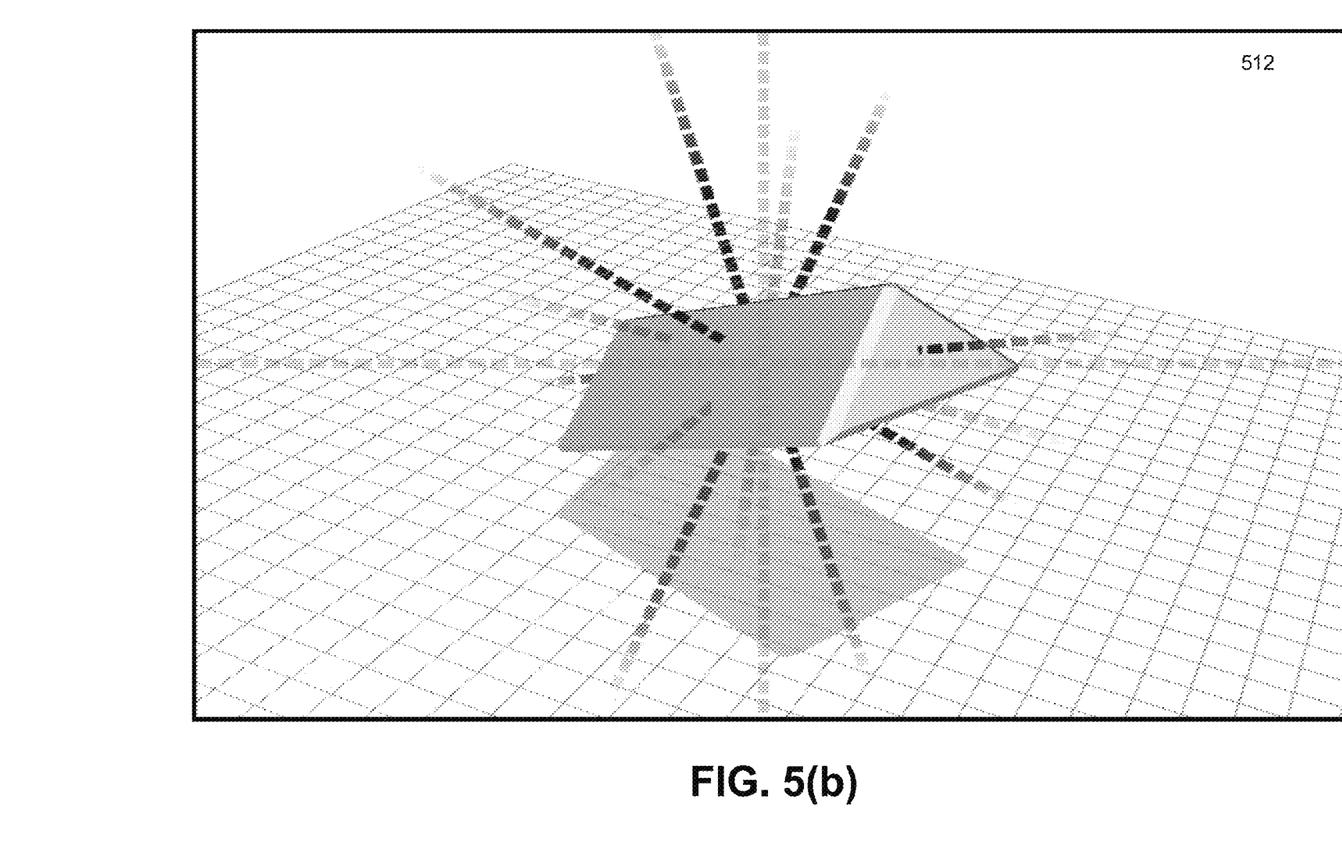
FIG. 5b is a schematic illustration of an example of different sets of axes that can be utilized for axis-based transformation manipulation.

The manipulations can be constrained by world-space axes, screen-space axes or the like. As shown in FIG. 5b, each set of axes can be displayed in any way to make them distinguishable, such as a different color (e.g., blue for object-space, red for world-space, green for screen-space). These are all drawn at the centroid of the selected object so that their relative projected orientations (angular difference) are immediately visible, as shown by element 512.

Figure 6:
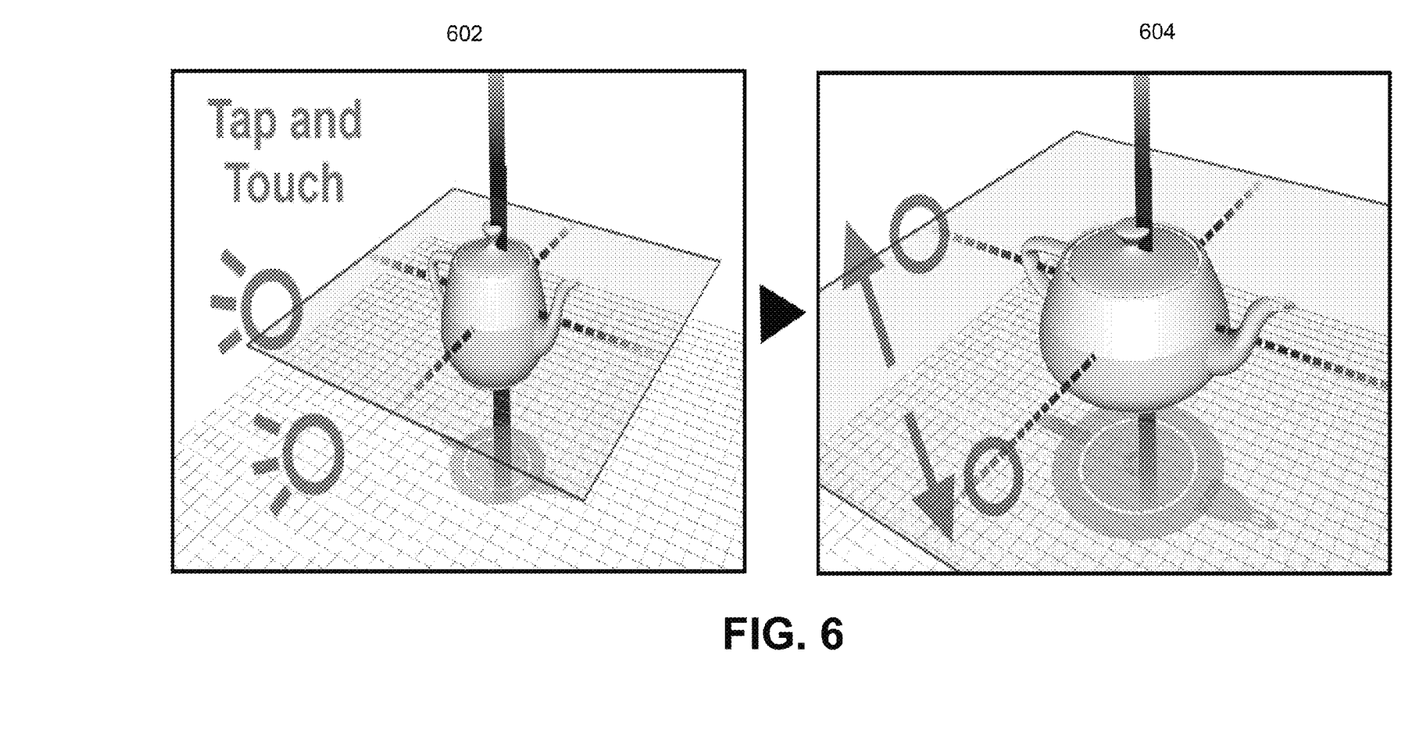
FIG. 6 is a schematic illustration of multi-touch gestures for planar constrained manipulation.

As shown in FIG. 6, single-axis-based transformations are not the only type of constrained manipulations. Another example can be plane constrained manipulations. The plane constraint allow object manipulations within a given 3D plane, which can be specified by selecting an axis orthogonal to the plane. To distinguish from the axis selection mode, a different gesture, such as a two-finger tap (e.g., quick touch and raise of two fingers) can be designated as the plane selection mode. At element 602 a semi-transparent plane can be displayed to visualize the selected plane constraint.

Plane-constrained operations can include translation and uniform scaling in plane. A two-finger tap 602 (represented as circles as an example) with an orientation along the normal direction of the plane (thickened line) selects the plane constraint (the shadow). Similar to single-axis translation, translation in plane can be performed by a two-finger pan (not illustrated). The movement of the fingers can be projected to the two defining axes on the plane to determine the amount of translation with respect to each axis. Uniform scaling in plane 604, with no scaling along plane normal, can be achieved by a two-finger pinch, with the scale determined by a distance change between the two contact points. The scaling of the object is done uniformly with respect to the plane. Note that rotation in plane is redundant since it is equivalent to rotation with respect to the plane normal.

The axis-constrained operations and plane-constrained operations are theoretically sufficient to construct any 3D rigid transformation. However, all the rigid transformations are always constrained to an axis or plane anchored at the object being manipulated. For the manipulations of multiple objects (e.g., for object assembly), interaction techniques can be utilized that can employ constraints from other objects, thus supporting manipulations relative to any arbitrary object.

One such interaction technique is snapping. Snapping can provide an effective way to achieve precise relationships between objects. Snapping can be achieved either passively or actively. Passive snapping relies on automatic detection of guiding lines or surfaces and, thus, often works only for nearby objects only. Active snapping is typically achieved with the user drawing a path connecting two objects, which can be far away. The two objects are automatically glued such that their position and/or orientation are aligned.

Figure 7:
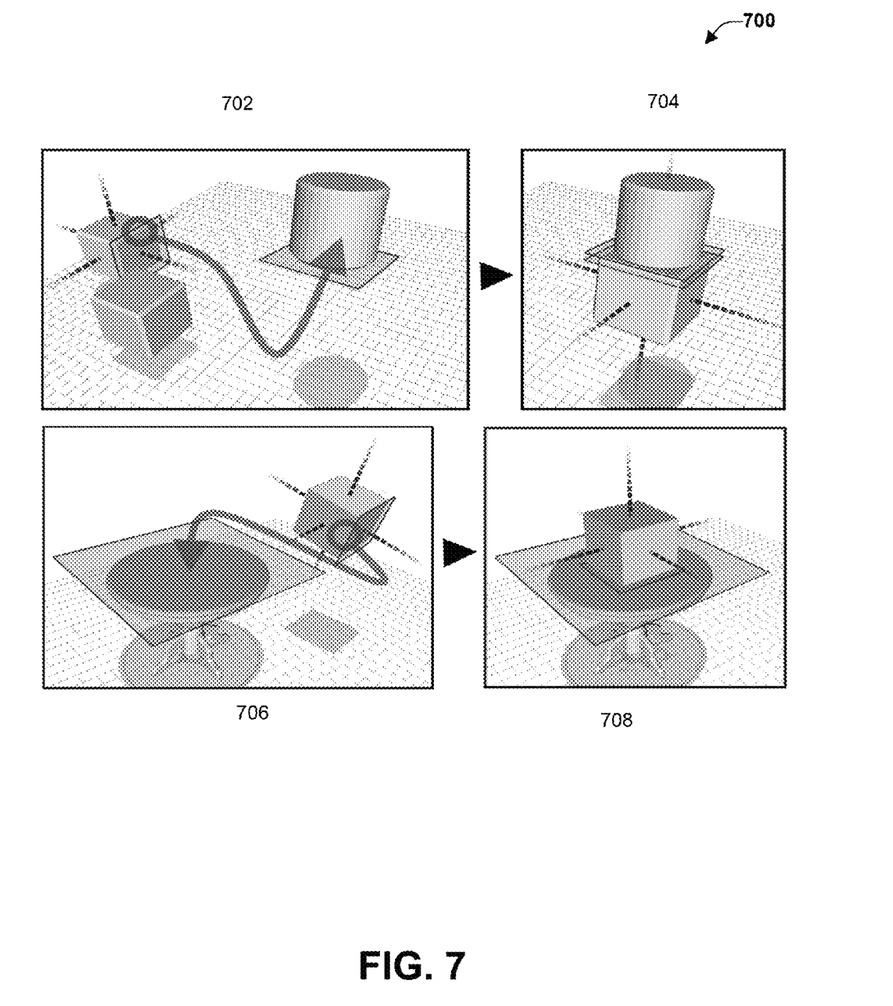
FIG. 7 is a schematic illustration of gestures for snapping manipulation.

Given the imprecise nature of touch interactions, a new gesture that is primary based on shape of motion path rather than precise location of touch points is utilized to correspond to snapping. These gestures are illustrated in FIG. 7. The tangent directions at the two ends of the curve (touch path) determine the two axes to be aligned when the source object is transformed and snapped to the target object (e.g., element 704 illustrates snapping based on the curve of element 702 and element 708 illustrates snapping based on the curve of element 706). For snapping, the pre-defined set of candidate axes is used to define snapping proxy (this applies to smooth surfaces as well). For each axis, a parallel pair of bounding planes can be defined normal to the axis as candidate snapping planes.

The tangent directions are utilized at the starting point and ending point of the touch path to automatically determine the snapping plane at the selected object and target object, respectively. This technique does not need an accurate position specification of the touch path, and is flexible, relying only on the tangent directions at the two ends of the drawn curve. This allows snapping of objects even when the snapping faces are invisible at the current camera view (e.g., target snapping plane in 702), greatly reducing the camera control effort.

The selected object is transformed such that the center and the normal of the snapping planes are aligned. There remains one DOF for the source object: rotation about the aligned normal of the snapping planes. A simple strategy can be used to determine the best rotation based on keeping as much of the originally visible faces visible. This is done by computing the dot product of each axis of the source object and the viewing direction, and selecting the alignment that minimizes the sum of the differences between the dot products before and after the snapping. Note that users always have the freedom to adjust this rotation angle after snapping. Overall, the snapping operation avoids the otherwise tedious manipulations of the objects, giving a convenient interface for multiple object manipulations.

Setting up arbitrary axes or pivots is typically tedious and time-consuming. However, it is often the case that the desired manipulation constraint of an object exists in the candidate constraints of another scene object. The modeling system described herein supports simple interaction to borrow axes and center of another object for manipulations, allowing relative manipulations of an object with respect to any object.

To use the axes of another object for manipulating a selected object, the user simply marks the desired axis provider using single-finger long press. The new set of axes are then displayed centered at the selected object, which can then be manipulated with respect to the new axis set. Another single-finger long press on the axis provider toggles to the mode of borrowing not only the axis set but also the center of the provider for manipulation. Since the center of the provider is being used, the borrowed axes remain drawn at the provider.

Figure 8:
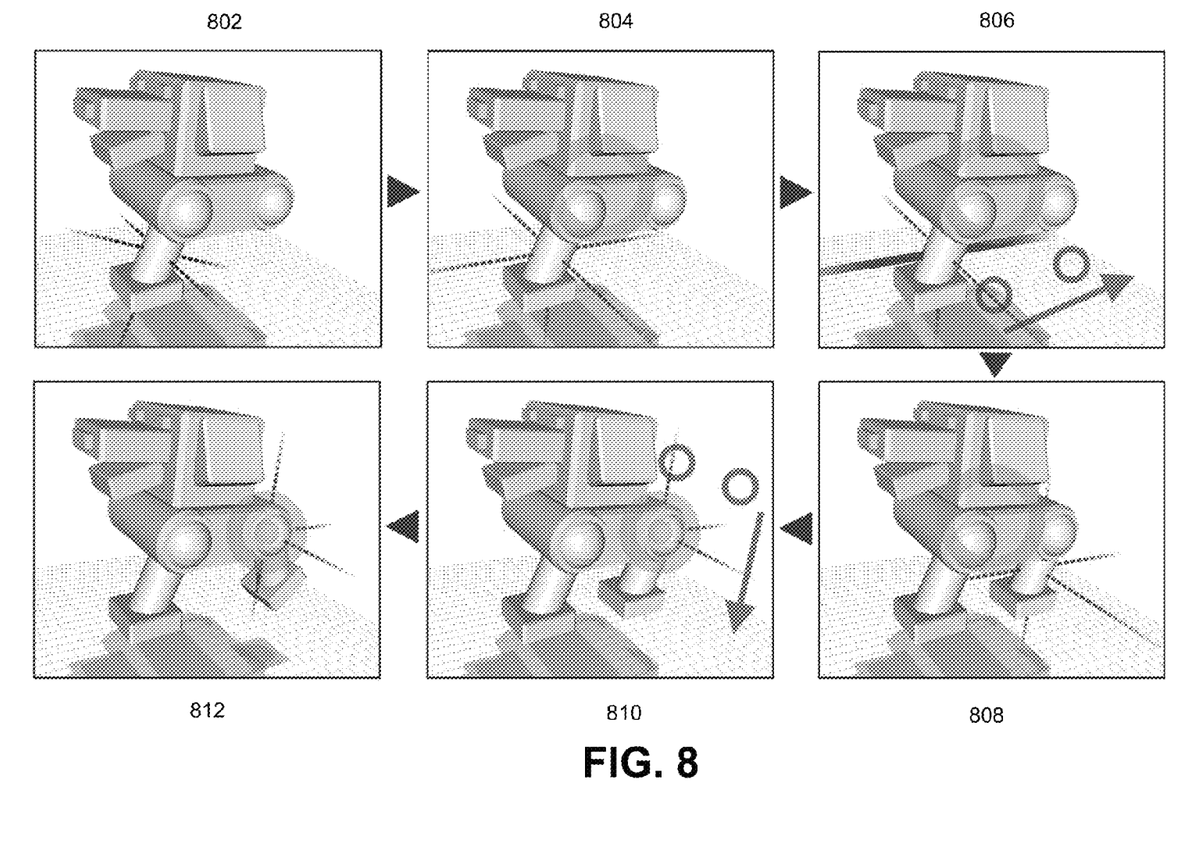
FIG. 8 is a schematic illustration of multi-touch gestures for axes and center borrowing.

An example of this axes and center borrowing is illustrated in FIG. 8. In FIG. 8, the hind leg is rotated with respect to the center and an axis of the body. Note that this is similar to pivot objects in other interactive manipulation systems; however, this system allows any object to serve as an axis-center provider and does not explicitly distinguish between editable objects and pivot objects.

In FIG. 8, the leg is selected for manipulation 802. A one-finger long press on the body borrows the axis set of the body for manipulating the leg 804. A two-finger touch selects an axis constraint 806 and the front leg is duplicated and translated along the chosen axis 808. Another one-finger long press toggles to the mode of borrowing both the axis set and the center of the body 810. Since the center of the provider is being used, the borrowed axes remain drawn at the provider. The hind leg is rotated with respect to the borrowed center and axis 812.

Other operations can be used to support operations of the 3D modeling technique described herein. These supporting operations, which together with the manipulation operations introduced earlier form a complete system for basic 3D modeling and composition. Some of the operations below rely on a realtime finger and palm registration technique, which automatically determines which hand of the user is touching and which contact points belong to which fingers whenever three or more contact points are detected.

The finger and hand registration can include detecting at least three contact points corresponding to at least the thumb, index finger and middle finger and whether the hand is left or right hand. The at least three contact points are then connected to a reference point computed based on the contact points and spanning angles between the contact points utilizing the reference point as a vertex can be calculated. The thumb can be determined based on the spanning angles (the largest spanning angle corresponds to the thumb). The finger next to the thumb can be labeled as the index finger. Based on whether the index finger is clockwise or counter clockwise from the thumb, the right or left hand can be determined. Based on clockwise or counter-clockwise of fingers on left and right hand, the remaining contact points can be associated with the middle, ring fingers and pinkie. The finger registration information can be utilized to associate further gestures with other operations.

One operation is camera control. A perspective camera is adopted. For camera orbit, a one finger movement (starting from empty space) can be utilized to trigger a virtual trackball interface. Panning and zooming can be implemented using five-finger slide and pinch gestures, respectively.

Another operation is object selection. For selecting or deselecting an object, a one-finger tap on the object can be used. A one-finger double-tap centers the tapped object in the screen space. To select multiple objects, two-finger tap on another object to add it to the current selection. A tap on the empty space deselects all the objects.

Another operation is uniform scaling. Given an object of interest (i.e., being selected), five-finger pinch with the left hand, for example, can be recognized as uniform scaling.

A further operation is screen-space rotation. When any of the screen-space axes is selected, a two-finger rotation can be interpreted as screen-space rotation, rotating the object about the viewing direction.

Another operation is object duplication. Duplication operation can be activated with three-finger pan. Depending on whether one or two objects are being selected, the duplicated object either undergoes axis-constrained translation (translation axis determined by the three-finger movement) or is directly transformed based on the relative transformation between the two selected objects, respectively.

Figure 9:
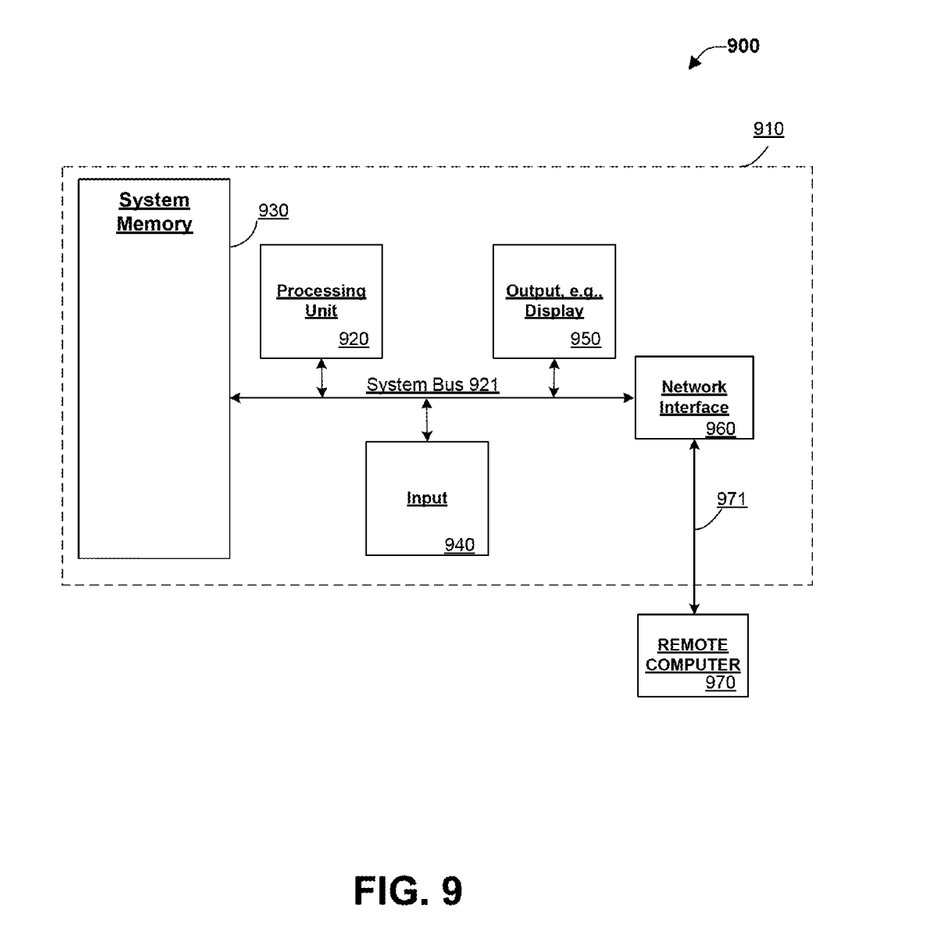
FIG. 9 is an example computing environment in which the various embodiments described herein can be implemented.
Figure 10:
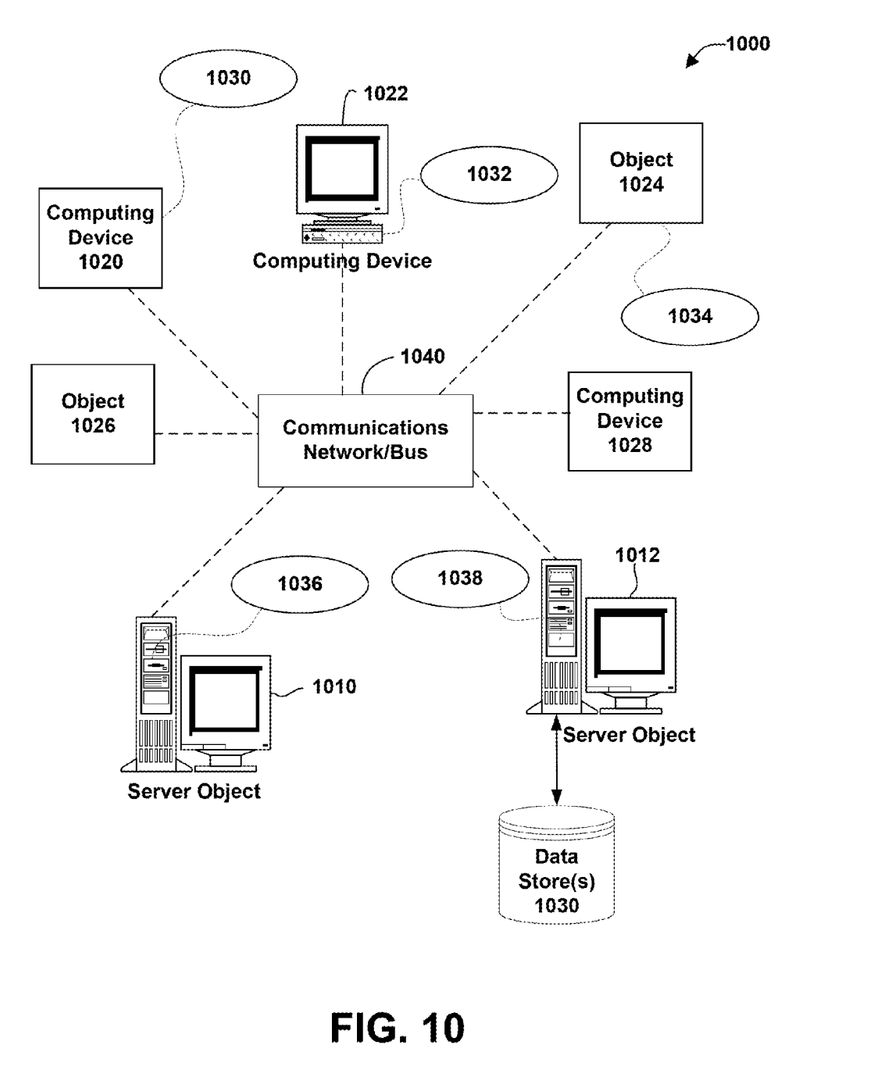
FIG. 10 is an example of a computer network in which various embodiments described herein can be implemented.

The systems and methods described above can be implemented in software, hardware, or a combination thereof. FIGS. 9 and 10 provide hardware context for the devices, user interfaces and methods described above. FIG. 9 illustrates a computing environment 900 that can be utilized in connection with the devices, user interfaces and methods described above. FIG. 10 illustrates a computing network 1000 that can be utilized in connection with facilitating the systems and methods described above. It should be appreciated that artificial intelligence can also be utilized to implement the systems and methods described herein.

Referring now to FIG. 9, illustrated is an example of a suitable computing system environment 900 in which one or more of the embodiments can be implemented. The computing system environment 900 is just one example of a suitable computing environment and is not intended to suggest any limitation as to the scope of use or functionality of any of the embodiments. Neither should the computing environment 900 be interpreted as having any dependency or requirement relating to any one or combination of components illustrated in the exemplary operating environment 900.

With reference to FIG. 9, the computing system environment 900 is shown as a handheld computer 910. However, the computer need not be a handheld computer. The computer need only be capable of interfacing with a multitouch input device and/or receiving a multi-touch input. The multitouch input device also need not be handheld. However, the computing system environment 900 can be any other computing device with a processor to execute the methods described herein and a multi-touch display, such as a desktop computer, a laptop computer, a mobile phone, a mobile internet device, a tablet, or the like. Components of the handheld computer 910 can include, but are not limited to, a processing unit 920, a system memory 930, and a system bus 921 that couples various system components including the system memory to the processing unit 920. For example, the methods described herein can be stored in the system memory 930 and executed by the processing unit 920.

The handheld computer 910 can also include a variety of computer readable media, including tangible computer readable storage media, and can be any available media that can be accessed by computer 910. The system memory 930 can include computer storage media in the form of volatile and/or nonvolatile memory such as read only memory (ROM) and/or random access memory (RAM). By way of example, and not limitation, memory 930 can also include an operating system, application programs, other program modules, and program data.

A user can enter commands and information into the computer 910 through input devices 940, such as entering commands via a gesture on a multi-touch input device. A monitor or other type of display device can also connected to the system bus 921 via an interface, such as output interface 950.

The computer 910 can operate in a networked or distributed environment using logical connections to one or more other remote computers, such as remote computer 970. The remote computer 970 can be a personal computer, a server, a router, a network PC, a peer device or other common network node, or any other remote media consumption or transmission device, and can include any or all of the elements described above relative to the computer 910. The logical connections depicted in FIG. 9 include a network 971, such local area network (LAN) or a wide area network (WAN), but can also include other networks/buses. Such networking environments are commonplace in homes, offices, enterprise-wide computer networks, intranets and the Internet.

Referring now to FIG. 10, illustrated is a schematic diagram of an exemplary networked or distributed computing environment 1000. The handheld computer of FIG. 10 can be operational in the network of FIG. 10. The distributed computing environment comprises computing objects 1010, 1012, etc. and computing objects or devices 1020, 1022, 1024, 1026, 1028, etc., which can include programs, methods, data stores, programmable logic, etc., as represented by applications 1030, 1032, 1034, 1036, 1038. It can be appreciated that objects 1010, 1012, etc. and computing objects or devices 1020, 1022, 1024, 1026, 1028, etc. can comprise different devices, such as remote controllers, PDAs, audio/video devices, mobile phones, MP3 players, laptops, etc.

Each object 1010, 1012, etc. and computing objects or devices 1020, 1022, 1024, 1026, 1028, etc. can communicate with one or more other objects 1010, 1012, etc. and computing objects or devices 1020, 1022, 1024, 1026, 1028, etc. by way of the communications network 1040, either directly or indirectly. Even though illustrated as a single element in FIG. 10, network 1040 can comprise other computing objects and computing devices that provide services to the system of FIG. 10, and/or can represent multiple interconnected networks, which are not shown. Each object 1010, 1012, etc. or 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the delayed interaction model as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As a further non-limiting example, various embodiments described herein apply to any handheld, portable and other computing devices and computing objects of all kinds are contemplated for use in connection with the various embodiments described herein, i.e., anywhere that a device can request pointing based services. Accordingly, the general purpose remote computer described below in FIG. 10 is but one example, and the embodiments of the subject disclosure can be implemented with any client having network/bus interoperability and interaction.

Although not required, any of the embodiments can partly be implemented via an operating system, for use by a developer of services for a device or object, and/or included within application software that operates in connection with the operable component(s). Software can be described in the general context of computer executable instructions, such as program modules, being executed by one or more computers, such as client workstations, servers or other devices. Those skilled in the art will appreciate that network interactions can be practiced with a variety of computer system configurations and protocols.

The above description of illustrated embodiments, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims.

What is claimed is:

1. A method, comprising:

selecting a three dimensional focus object utilizing a first touch gesture on a multi-touch display device, wherein the first touch gesture comprises a touch of a displayed representation of the three dimensional focus object via a touch sensitive portion of the multi-touch display device and a release of the touch from the touch sensitive portion of the multi-touch display device after the three dimensional focus object is selected;

selecting a constraint for manipulating the three dimensional focus object based on an orientation of a second touch gesture, wherein the second touch gesture comprises a second touch of at least two touch points via the touch sensitive portion of the multi-touch display device and wherein the constraint is selected based on the orientation of the at least two touch points of the second touch gesture relative to the three dimensional focus object after the three dimensional focus object has been selected;

determining a manipulation type based on motion of the touch points of the second touch gesture on the touch sensitive portion of the multi-touch display device;
setting a magnitude of the constrained manipulation based on the motion of the touch points of the second touch gesture on the touch sensitive portion of the multi-touch display device; and
applying the constrained manipulation to the three dimensional focus object based on the magnitude.

2. The method of claim 1, wherein the selecting the constraint for manipulating the three dimensional focus object further comprises selecting an axis-based manipulation based on the orientation of the at least two touch points of the second touch gesture relative to the three dimensional focus object after the three dimensional focus object has been selected.

3. The method of claim 2, wherein the selecting the axis-based manipulation further comprises:
selecting an axis constraint based on the orientation of the touch points of the second touch gesture; and
the determining the manipulation type based on the motion of the touch points of the second touch gesture comprises determining that the manipulation type is a translation, a rotation or a scaling.

4. The method of claim 1, wherein the selecting the selecting the constraint for manipulating the three dimensional focus object further comprises selecting a planar constrained manipulation.

5. The method of claim 4, wherein the selecting the planar constrained manipulation further comprises:
selecting a plane constraint based on the orientation of the touch points of the second touch gesture; and
the determining the manipulation type based on the motion information of the second touch gesture comprises determining that the manipulation type is a translation in the plane or a uniform scaling in the plane.

6. The method of claim 1, wherein the selecting the constraint for manipulating the three dimensional focus object further comprises selecting an axis transfer to manipulate the three dimensional focus object with respect to a second displayed object.

7. The method of claim 1, wherein the selecting the constraint for manipulating the three dimensional focus object further comprises selecting a snapping-to-object-feature via touching a curve gesture on the touch sensitive portion of the multi-touch display device, wherein the curve gesture connects the three dimensional focus object with a second object.

8. A non-transitory computer readable storage medium having instructions stored thereon that, in response to execution, facilitate performance of operations by a system comprising a processor, the operations comprising:
changing a viewing parameter in a virtual 3D environment based on a touch motion;
manipulating a three dimensional object with constraints based on the touch motion, wherein the three dimensional object has been selected via a previous administered first touch gesture; and
snapping the three dimensional object to a second three dimensional object based on an orientation and geometry information of a touch path input.

9. The non-transitory computer readable storage medium of claim 8, wherein the operations further comprise:
detecting at least three contact points of a second touch gesture on a multi-touch display device;
computing a reference point and a predefined axis of an object based on the contact points;
calculating spanning angles between the contact points utilizing the reference point;
associating a thumb and an index finger with the contact points based on the spanning angles and distances between contact points;
associating a left hand or a right hand with the contact points based on an orientation of the thumb and the index finger; and
associating a middle finger, a ring finger and a pinkie to the other contact points based on the clockwise or anticlockwise finger order of a right or left hand respectively.

10. The non-transitory computer readable storage medium of claim 9, wherein the operations further comprise: detecting a motion and a path associated with the contact points.

11. The non-transitory computer readable storage medium of claim 8, wherein the operations further comprise: determining a manipulation type on the touch motion.

12. The non-transitory computer readable storage medium of claim 8, wherein the operations further comprise: adjusting a viewing point based on the touch motion.

13. The non-transitory computer readable storage medium of claim 8, wherein the operations further comprise: adjusting a viewing direction based on the touch motion.

14. A system, comprising:
a memory to store instructions; and
a processor, communicatively coupled to the memory, that executes or facilitates execution of the instructions to perform operations, comprising:
receiving a selection of a focus object for manipulation based on a first touch gesture;
selecting a constraint from candidate constraints for the focus object based on an orientation of at least two contact points determined from a second touch gesture;
determining a transformation mode based on a motion path of the at least two contact points with respect to the constraint; and
applying a constrained transformation to the focus object, wherein the constrained transformation is performed with a magnitude of transformation based on an amount of touch movement along the motion path.

15. The system of claim 14, wherein the second touch gesture is a two-finger multi-touch gesture.

16. The system of claim 14, wherein the constraint is an axis chosen from axes corresponding to the focus object.

17. The system of claim 14, wherein the transformation mode is motion of the focus object relative to an axis of the focus object.

18. The system of claim 17, wherein the motion of the focus object is a translation, a scaling, or a rotation of the focus object relative to an axis of the focus object.

19. The system of claim 14, wherein the transformation mode is related to a plane.

20. The system of claim 19, wherein the transformation mode is a translation or a scaling of the focus object relative to the plane.

* * * * *